United States Patent
Usman et al.

(10) Patent No.: US 10,230,623 B2
(45) Date of Patent: Mar. 12, 2019

(54) END POINT SCALING ON SEGMENT ROUTING FABRICS

(71) Applicant: Cisco Technology, Inc., San Jose, CA (US)

(72) Inventors: Malick Mohamed Usman, San Jose, CA (US); Srinivasan Ramabadran, Sunnyvale, CA (US); Raghava Sivaramu, Sunnyvale, CA (US); Sriram Srinivasan, San Jose, CA (US); Srini Ananthakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 15/217,819

(22) Filed: Jul. 22, 2016

(65) Prior Publication Data
US 2018/0026874 A1  Jan. 25, 2018

(51) Int. Cl.
| H04L 12/28 | (2006.01) |
| H04L 12/707 | (2013.01) |
| H04L 12/46 | (2006.01) |
| H04L 12/721 | (2013.01) |

(52) U.S. Cl.
CPC .......... *H04L 45/24* (2013.01); *H04L 12/4633* (2013.01); *H04L 45/124* (2013.01)

(58) Field of Classification Search
CPC ........... H04L 29/0653; H04L 29/06095; H04L 49/3009; H04L 49/309; H04L 45/74
See application file for complete search history.

(56) References Cited

U.S. PATENT DOCUMENTS

| 2012/0163381 A1* | 6/2012 | Lam ................... H04L 12/4641 370/392 |
| 2014/0269266 A1* | 9/2014 | Filsfils .................... H04L 43/50 370/228 |
| 2014/0269721 A1* | 9/2014 | Bashandy ............... H04L 41/12 370/392 |

* cited by examiner

*Primary Examiner* — Siren Wei
(74) *Attorney, Agent, or Firm* — Polsinelli PC (57) ABSTRACT

Disclosed are systems and methods for scaling Massively Scalable Data Center (MSDC) networks with a large number of end-point tunnels utilizing Equal-cost multi-path routing (ECMP). The systems and methods can use the NO-OP label operations to maintain single ECMP objects to switch a set of segment routing tunnels that share the same ECMP links. The forwarding engine can determine the use of the NO-OP label operation and update a received packet to enable the use of the single ECMP objects of the set of segment routing tunnels.

18 Claims, 7 Drawing Sheets

END POINT SCALING ON SEGMENT ROUTING FABRICS

TECHNICAL FIELD

The present disclosure relates to segment routing and more specifically to scaling segment routing in Massively Scalable Data Center networks.

BACKGROUND

Segment Routing is a new technology focusing on addressing pain points of existing multiprotocol label switching networks. Segment routing addresses these pain points by providing source routing (i.e., the transmitting node can define the path of tunnels the packet will take).

However, Segment Routing can run into issues when operating in a Massively Scalable Data Center (MSDC) networks with a large number of end point tunnels utilizing Equal-cost multi-path routing (ECMP). ECMP is a routing strategy where next-hop packet forwarding to a single destination can occur over multiple "best paths" which tie for top place in routing metric calculations. For each Segment Routing tunnel, ECMP needs to allocate unique ECMP objects (i.e., per end-point) to carry the tunnels, even if the ECMP links to be traversed are the same. Accordingly, when Segment Routing tunnel end-points are scaled up, ECMP resources can quickly deplete, crippling the network.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Segment routing is a network technology focused on addressing the pain points of existing IP and Multiprotocol Label Switching (MPLS) networks in terms of simplicity, scale, and ease of operation.

MSDC networks are a collection of design tenets configured as a framework that data center architects can use to build elastic data centers that host a few applications that are distributed across thousands of servers and that scale from department to internet scale audiences. Unlike a traditional data center, which hosts applications deployed in silos, the MSDC data center is characterized by a few very large applications that are distributed over geographically-distributed homogenous pools of compute and storage.

In MSDC networks, all nodes along the path (i.e., segment routing tunnel) may use the same label to switch a tunnel to the end-point (e.g., incoming portion of the label and outgoing portion of the label are the same regardless of the outgaining ECMP link being traversed) when utilizing segment routing.

Disclosed is a system and method of scaling segment routing.

Description

The present disclosure addresses the issues in the art and provides a solution for scaling segment routing. Segment Routing is defined in many different IETF drafts/RFCs (see an overview here: http://www.segment-routing.net/home/ietf). This disclosure does not claim novelty regarding segment routing itself or its functionality/capability. Rather, the present disclosure focuses on the implementation of segment routing in a new way such that it prevents scaling issues within a segment routing network that can commonly occur from the use of unique labels to address tunnel end points.

During negotiation of a segment routing tunnel the control plane of the nodes (e.g., forwarding engines, routers, hop, etc.) along the path can negotiate the rules for transmitting data (e.g., packets) to the end-points of the tunnel. The negotiation can include determining whether the nodes (along the tunnel) have the capability to perform "NO-OP" label operations. When available, a node can be configured to use the "NO-OP" label operation. When using the "NO-OP" label operations, the control plane can configure the data plane of the forwarding engine (e.g., router, etc.) to preserve the original incoming stack (i.e., routing information to the end-point) ignoring the outgoing portion of the label while sharing the ECMP links and L2 rewrite information of the database. When the "NO-OP" label operations are not available, a node can be configured to push a "NULL" value to the label. "NO-OP" stands for no operation, for example, when a forwarding engine receives an "NO-OP" label, it will move to the next instruction (e.g., transmit the packet to the next hop without performing label operations).

When a node does not use the "NO-OP" label operation and before a packet is transmitted to the next hop the node can push an additional label value (e.g., "NULL") to the top of the label stack. This additional label value indicates, to the next node, that incoming portion of the label (i.e., not the outgoing portion of the label) should be used in determining the forwarding decision. The "NULL" label also indicates the forwarding node should not perform any label operations (e.g., swap, etc.) and the packet (and label) be sent to the next node along the path as is. The "NULL" label enables adjacencies to be shared across multiple ECMP resources.

When a node uses the "NO-OP" label operation, the outgoing portion of the label is ignored when a packet is received, no label operations are performed (e.g., swap, push, etc.), a best next node is determined based on the label, and the packet is transmitted to the best next node along the path of the segmented routed tunnel.

Figure 1:
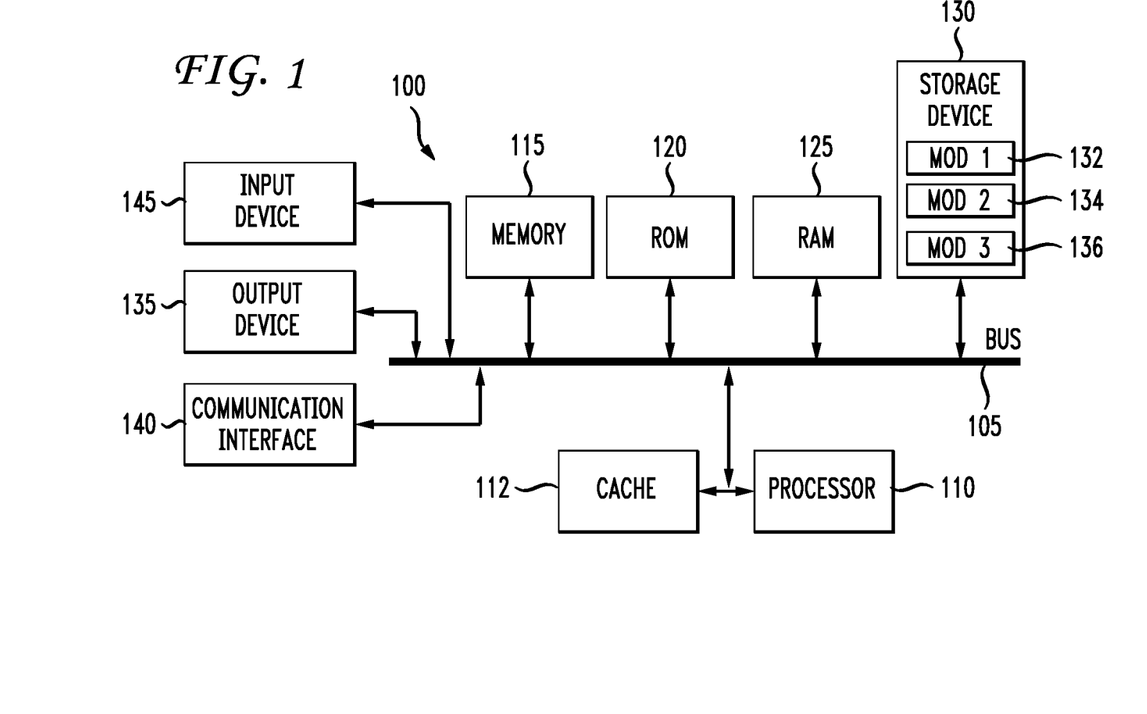
FIG. 1 illustrates the basic computing components of a computing device according to an aspect of this disclosure.

The disclosure first turns to FIG. 1, which discloses some basic hardware components that can apply to system examples of the present disclosure. Following the discussion of the basic example hardware components, the disclosure will turn to the segment routing as a service concept. With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide non-volatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device 135 such as a display, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
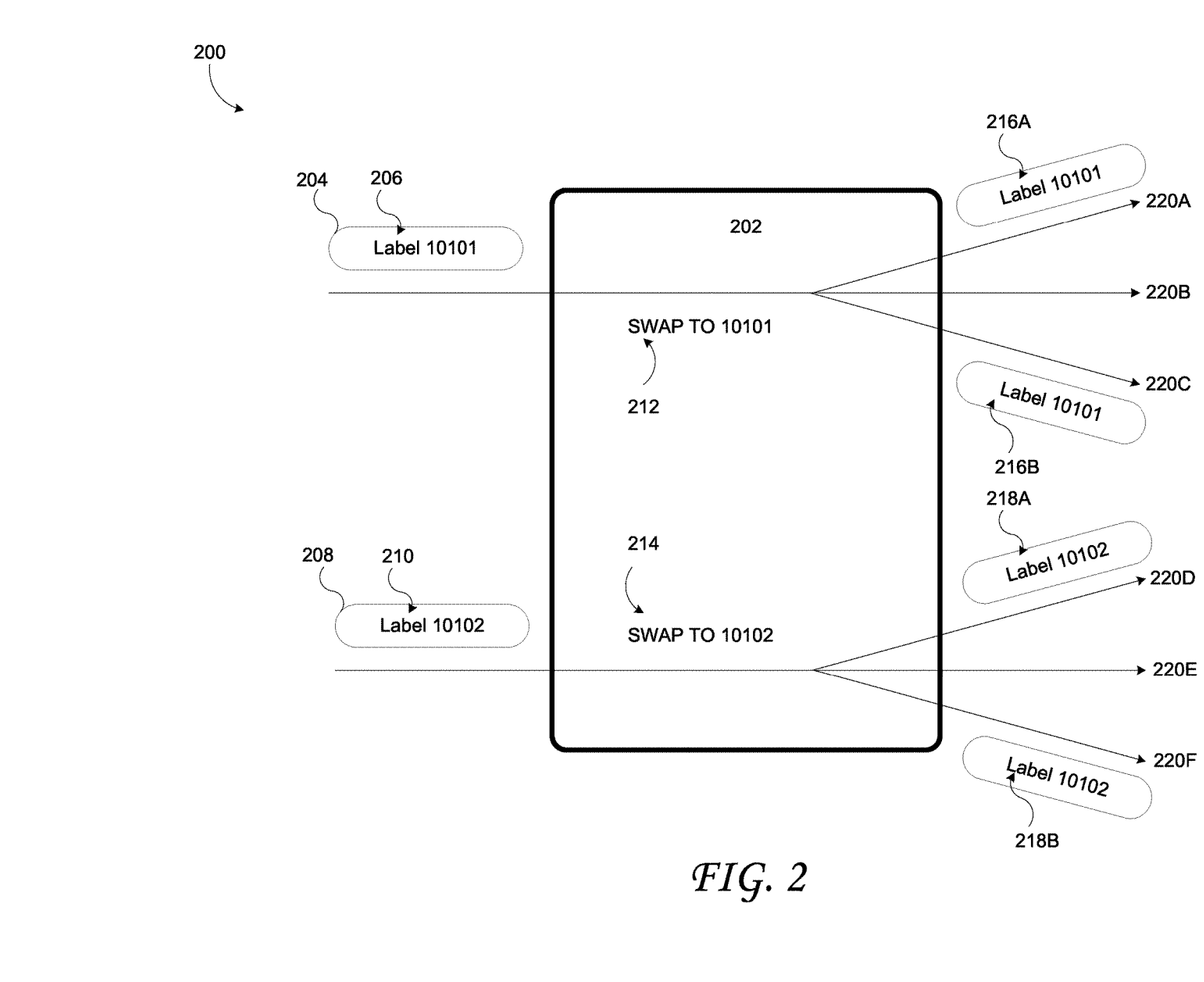
FIG. 2 illustrates an existing use of ECMP objects in the forward path of an MSDC network.

The disclosure now turns to FIG. 2, which illustrates an existing use of ECMP objects in the forwarding paths of tunnels. Forwarding engine (e.g., 202) can receive one or more packets (e.g., 204, 208). The forwarding engine (e.g., node, hop, etc.) can include hardware (e.g., router, switch, etc.) and/or software (e.g., routing algorithms, database, tables, control software, etc.). The one or more packets can each include a label (e.g., 206, 210). In some examples, the label can include an incoming portion, adjacent portion, and an outgoing portion.

In response to receiving packets (e.g., 204, 208), forwarding engine (e.g., 202) can perform a swap operation (e.g., 212, 214). In a swap operation, the label (e.g., 206, 210) is swapped with a new label (e.g., 216A, 216B, 218A, 218B), and the packet is forwarded to the next hop (e.g., the next forwarding engine). For example, the outgoing portion of the label can be swapped with the incoming potion of the label. The control plane can determine the next hop which can be written in the outgoing portion of the label. In a segment routing tunnel, the incoming portion and outgoing portion of the labels are equivalent. As such, the new label is equivalent to the previous label resulting in operations that can deplete resources. Further, for each path of the segment routing tunnel (e.g., 220A-F), ECMP needs to allocate unique ECMP objects (i.e., per end-point) to carry the tunnels (e.g., 220A-F), even if the ECMP links to be traversed are the same (i.e., because each tunnel is assigned its own label). Accordingly, the existing use demonstrated in FIG. 2 can quickly deplete ECMP resources, crippling the network.

Segment routing uses a unique label for a given tunnel (i.e., to an end-point) in a network. All the nodes along the path to the given end-point use the same label to traverse a given tunnel to that end-point. Accordingly, the incoming portion of the label and the outgoing portion of the label for a segment routing tunnel are the same, irrespective of the ECMP links traversed. As such, the following disclosures can take advantage of these aspects to optimize the use of ECMP objects in the forwarding paths.

Figure 3:
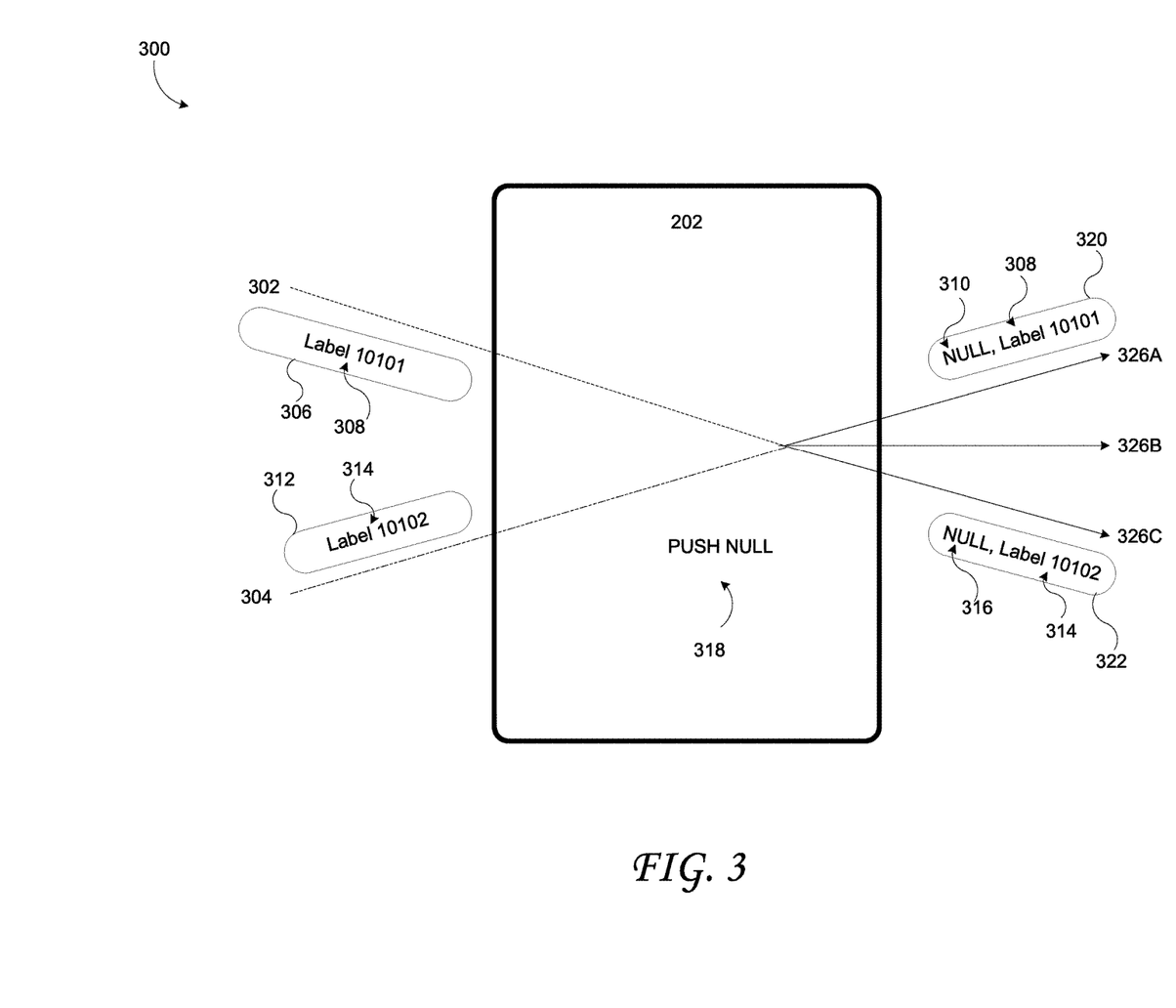
FIG. 3 illustrates an example use of ECMP objects in the forward path of an MSDC network shown in method in FIG. 4.
Figure 4:
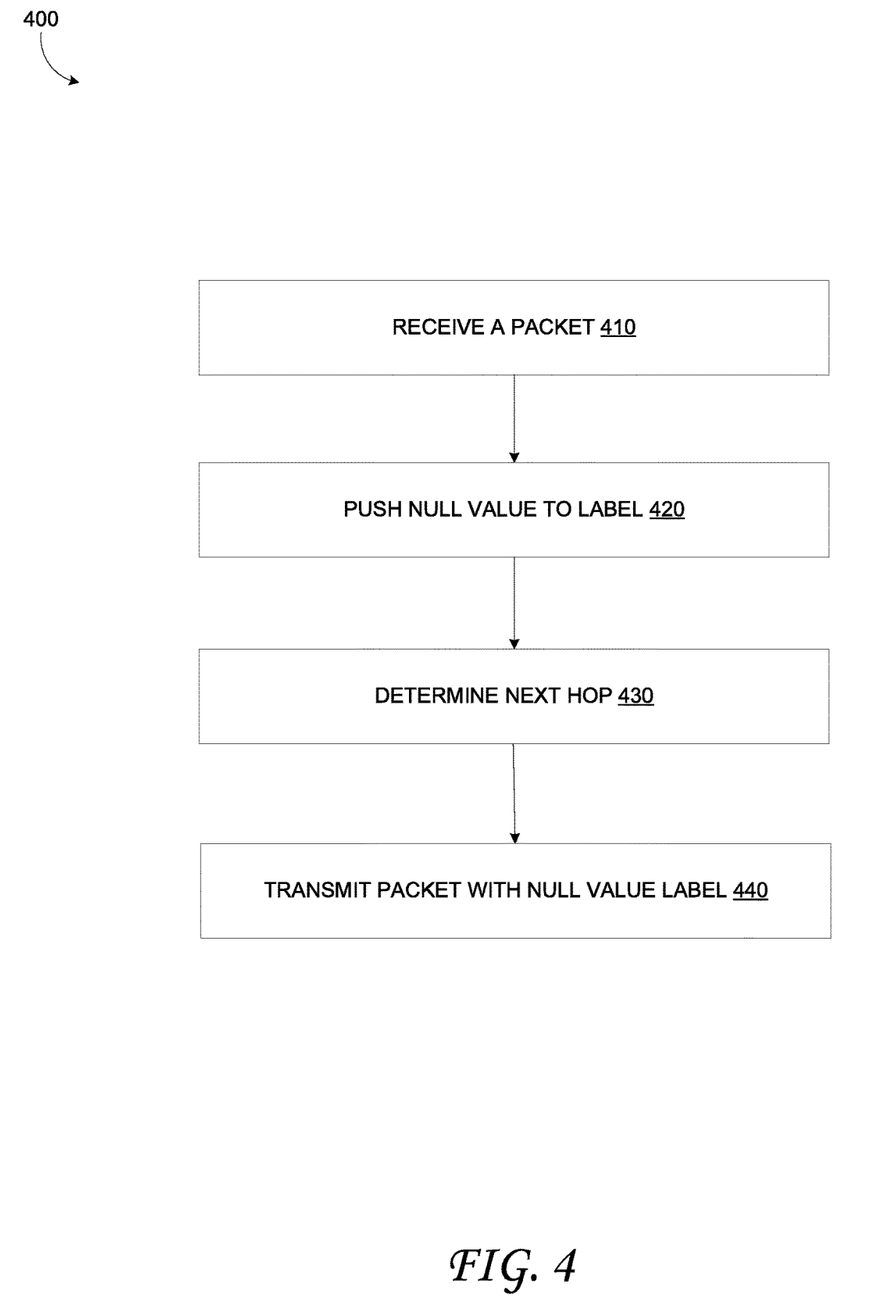
FIG. 4 illustrates an example method of scaling a segment routing network.

The disclosure now turns to FIGS. 3 and 4, which illustrate an example use of ECMP objects in the forwarding path that does not utilize NO-OP, and a corresponding method of the example use of ECMP objects in the forwarding path that does not utilize NO-OP.

MSDC network topology 300 can include forwarding engine (e.g., 202) configured to receive one or more packets (e.g., 306, 312) over one or more paths (e.g., 302, 304). The one or more packets can include incoming portion and outgoing portion of the labels (e.g., 308, 314). As previously discussed, in segment routing tunnels, the incoming portion and outgoing portion of a label are equivalent. From the perspective of transmitting a packet from a node, the incoming portion of the labels can represent node (e.g., server, router, switch, etc.) the packets (e.g., 306, 312) are send from and the outgoing portion of the label represent next hop nodes (e.g., adjacent nodes or nodes at a specific path of tunnels to traverse). In a segment routing tunnels, the node that transmitted the packet and the node that will be receiving the packet are in the same tunnel, and thus have the same label.

In response to receiving packets (e.g., 306, 312), forwarding engine (e.g., 202) can push "null" (e.g., 318) to the top of the label stack (i.e., in front of the outgoing portion of the label). In a push operation, a new label value can push an existing label value (e.g., outgoing portion, incoming portion, etc.) further down the stack. Here, the labels (incoming portion and outgoing portion) of the packets are pushed down with "null." Accordingly, forwarding engine (e.g., 202) can transmit packets (e.g., 320, 322) with labels (e.g., 308, 314) and NULL (e.g., 310, 316) over the best paths of tunnels (e.g., 326A-C) to the next hop.

The next hop that receives the transmitted packets (e.g., 320, 322) can pop (i.e., ignore) the NULL value (e.g., 310, 316) and use labels (e.g., 308, 314) to determine the forwarding path (e.g., next hop).

In using the approach of FIG. 3, a forwarding engine (e.g., node, hop, etc.) can maintain a single ECMP object to switch a set of paths of segment routing tunnels that share the same ECMP links. This is possible because the label re-write operation (e.g., push null) is the same for all the tunnels that share a given ECMP link. This approach also enables adjacent nodes (e.g., local segment to a specific segment routing node, it is locally significant—does not have to be unique among nodes) to be shared across multiple ECMP sets. In the absence of the approach in FIG. 3, a forwarding engine (e.g., node, hop, etc.) would allocate a unique ECMP set and corresponding unique adjacencies to ensure that the incoming portion of the label and outing label are the same.

The approach of pushing a "null" to the top of the stack of the label to enable the sharing of the same ECMP links is described using example method 400 of FIG. 4. The method shown in FIG. 4 is provided by way of example, as there are a variety of ways to carry out the method. Additionally, while the example method is illustrated with a particular order of sequences, those of ordinary skill in the art will appreciate that FIG. 4 and the sequences shown therein can be executed in any order that accomplishes the technical advantages of the present disclosure and can include fewer or more sequences than illustrated.

Each sequence shown in FIG. 4 represents one or more processes, methods or subroutines, carried out in the example method. The sequences shown in FIG. 4 can be implemented in a system such as network 300 shown in FIG. 3. The flow chart illustrated in FIG. 4 will be described in relation to and make reference to at least the elements of forwarding engine 202 shown in FIG. 3.

Method 400 can begin at step 410. At step 410 a packet can be received at a forwarding engine. For example, a packet (e.g., 306, 312) with labels (e.g., 308, 314) can be received at a network router (e.g., 202) of an MSDC network (e.g., 300) utilizing ECMP. The label can include an incoming portions and outgoing portions, which can both be the unique label for the given end-point the packet is trying to reach.

At step 420, the forwarding engine can push a "null" label value to the top of the label stack. When the top of the label stack is "null," the next hop (e.g., next node) will ignore the "null" value and proceed to the label (e.g., 308, 314) for routing to the next hop on the path of the segment routing tunnel (i.e., the packet would be presented to the forwarding engine as the packet entered the original stack). The "null" value also informs the control plan not to perform any label operations (e.g., swap, etc.) as shown in FIG. 2.

At step 430, the forwarding engine can determine the best next node in the path of the segment routing tunnel. The best next node can be determined based on ECMP principals.

At step 440, the forwarding engine can transmit the packet (i.e., with the top of the label stack as "null") to the next hop in the path of the tunnel. For example, forwarding engine (e.g., 202) can transmit packets (e.g., 320, 322) with labels (e.g., 308, 314) and top label values "null" (e.g., 310, 316) to the best next hop over the paths (e.g., 326A-C) of the tunnel. In this approach the forwarding engines (e.g., nodes, hops, etc.) can maintain a single ECMP object to switch a set of segment routing tunnels that share the same ECMP links.

Figure 5:
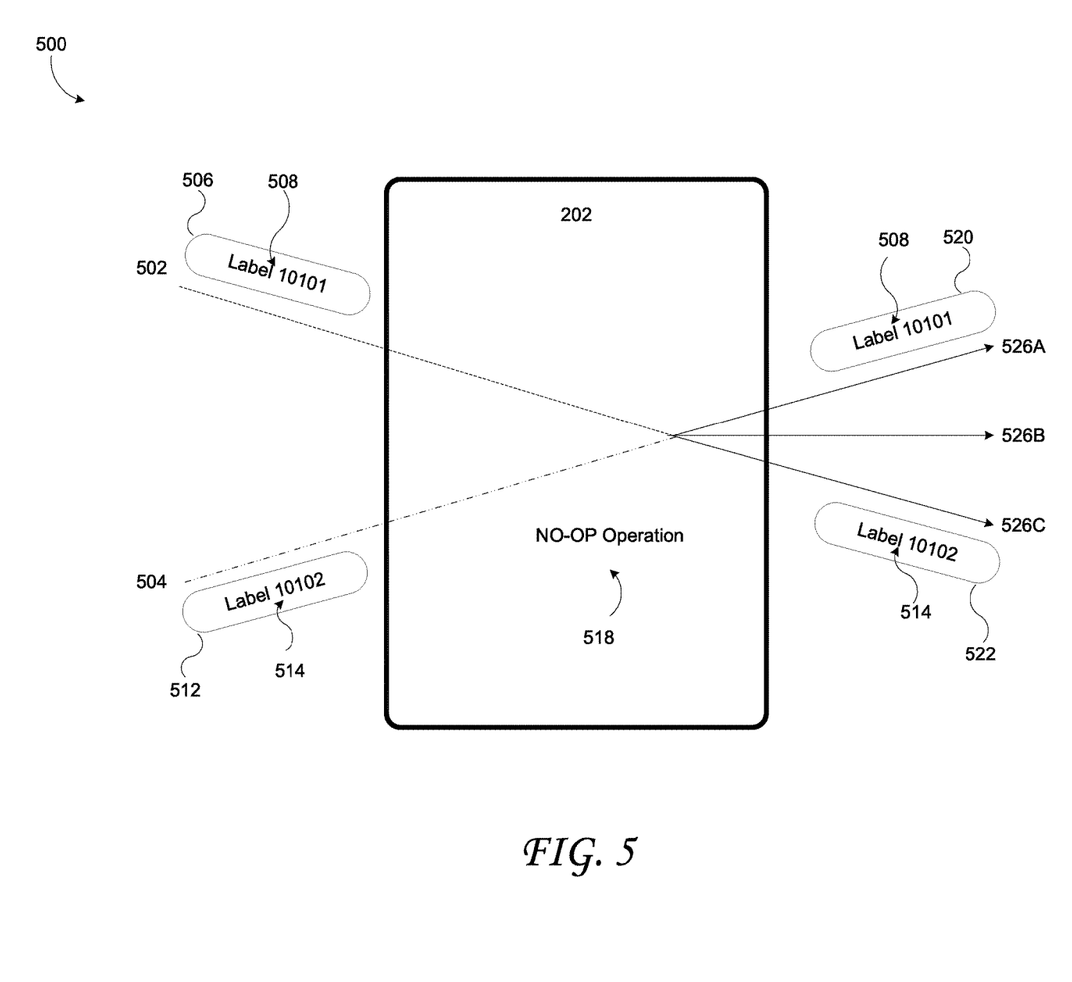
FIG. 5 illustrates another example use of ECMP objects in the forward path of an MSDC network shown in method in FIG. 6.
Figure 6:
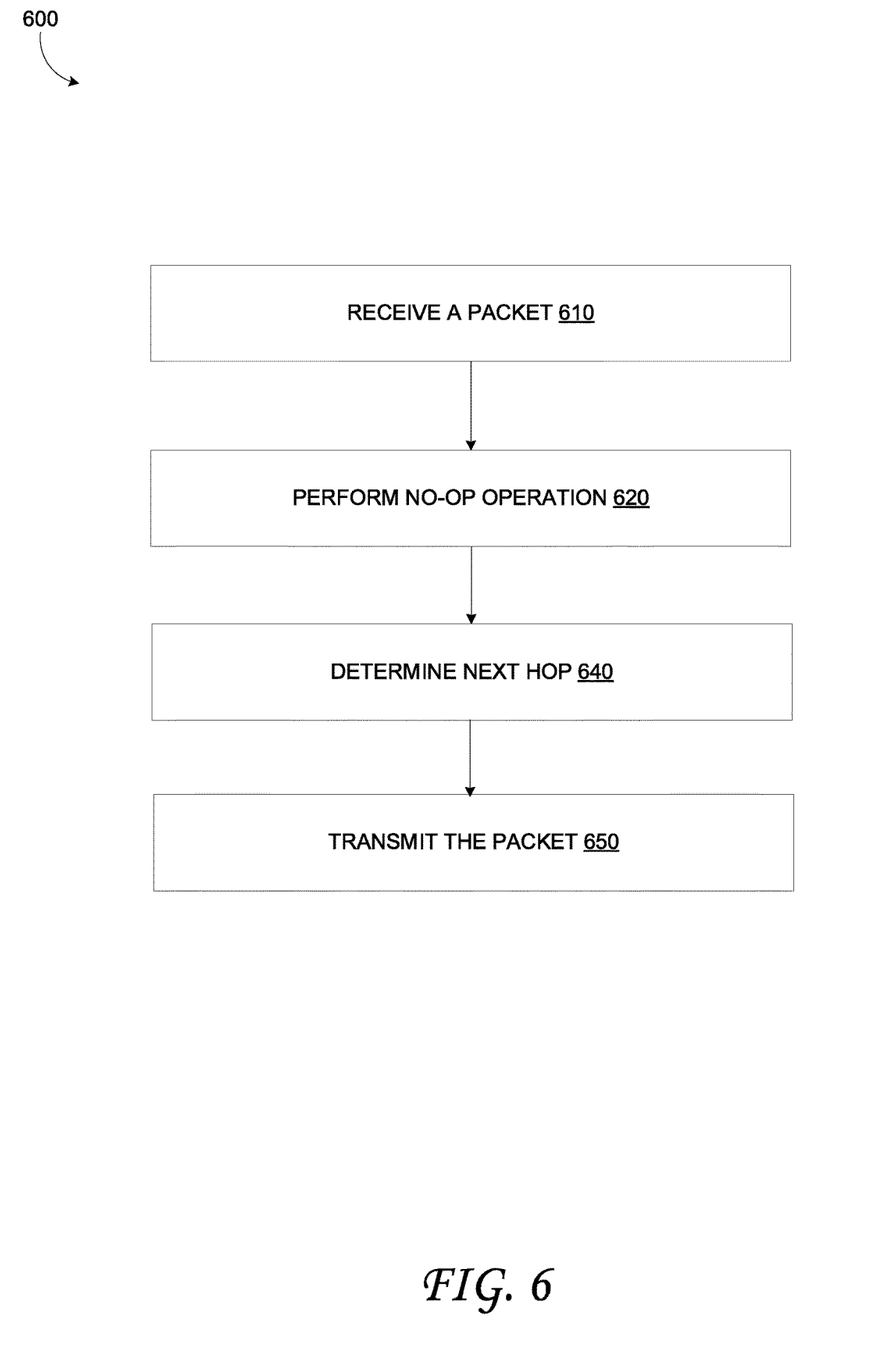
FIG. 6 illustrates another example method of scaling a segment routing network.

The disclosure now turns to FIGS. 5 and 6, which illustrate another example use of ECMP objects in the forwarding path using NO-OP operation, and a corresponding method of the another example use of ECMP objects in the forwarding path using NO-OP operation.

MSDC network topology 500 can include forwarding engine (e.g., 202) configured to receive one or more packets (e.g., 506, 512) over one or more paths (e.g., 502, 504). The one or more packets can include labels (e.g., 508, 514). As previously discussed the incoming portion and outgoing portion of the labels are equivalent, so only one label is shown in this example. The labels can correspond to unique segment routing tunnels associated with an end-point the packets (e.g., 506, 512) are trying to reach. In a segment routing tunnels, the node that transmitted the packet and the node that will be receiving the packet are in the same tunnel, and thus have the same label.

In response to receiving packets (e.g., 506, 512), forwarding engine (e.g., 202) can pop (e.g., 518) the label, while sharing ECMP object and program "NO-OP" as the label operation for the ECMP set. In a pop operation, the outgoing portion of the label is ignored from the packet, revealing the incoming portion of the label. Here, the outgoing portion of the labels are ignored and the incoming portion of the labels are used to determine the best next hop in the path of the segment routing tunnel. Accordingly, forwarding engine (e.g., 202) can transmit packets (e.g., 520, 522) with labels (e.g., 508, 514) over the best paths of tunnels (e.g., 524A-C) to the best next hop (e.g., node, forwarding engine).

The forwarding engine can also include control software (i.e., in the control plane) for maintaining a repository (e.g., database, table) of ECMP objects keyed by the set of ECMP links and L2 rewrite information. In the approach described directly above, the control software can ignore the outgoing portion of the labels while sharing ECMP objects (e.g., from the repository). The control software can further program "NO-OP" as label operation for that ECMP set and thereby preserving the original incoming stack which in turn steers traffic towards the tunnel end-point.

The next hop that receives the transmitted packets (e.g., 520, 522) can use the labels (e.g., 508, 514) to determine the next hop in the forwarding path.

The approach of ignoring the outgoing portion of the label to enable the sharing of the same ECMP links is described using example method 600 of FIG. 6. The method shown in FIG. 6 is provided by way of example, as there are a variety of ways to carry out the method. Additionally, while the example method is illustrated with a particular order of sequences, those of ordinary skill in the art will appreciate that FIG. 6 and the sequences shown therein can be executed in any order that accomplishes the technical advantages of the present disclosure and can include fewer or more sequences than illustrated.

Each sequence shown in FIG. 6 represents one or more processes, methods or subroutines, carried out in the example method. The sequences shown in FIG. 6 can be implemented in a system such as network 500 shown in FIG. 5. The flow chart illustrated in FIG. 6 will be described in relation to and make reference to at least the elements of forwarding engine 202 shown in FIG. 5.

Method 600 can begin at step 610. At step 610, a packet can be received at a forwarding engine. For example, a packet (e.g., 506, 512) with labels (e.g., 508, 514) can be received at a network router (e.g., 202) of an MSDC network (e.g., 500) utilizing ECMP. The incoming portion and outgoing portion of the labels can both be the unique label for the given end-point the packet is trying to reach (i.e., the same label).

At step 620, the control plane of the forwarding engine can ignore performing label operations on the label. For example, the forwarding engine (or included control software) can ignore performing a swap operation on the outgoing portion of the label (i.e., swapping the incoming portion with the outgoing portion) as shown in FIG. 2.

At step 630, the forwarding engine (or included control software) can share ECMP object and set the "NO-OP" as label operation for the ECMP set, thereby preserving the original incoming stack. Preserving the original incoming stack provides the forwarding engine enough data to steer traffic towards the path of the tunnel end-point.

At step 640, the control plane can determine the best next node in the path of the segment routing tunnel. The best next node can be determined based on ECMP principals and the label (e.g., segment routing tunnel end-point).

At step 650, the forwarding engine can transmit the packet to the next hop in the path of the tunnel. For example, forwarding engine (e.g., 202) can transmit packets (e.g., 520, 522) with labels (e.g., 508, 514) to the next hop in the paths (e.g., 524A-C) of the tunnel end-point. In some example, transmit packets (e.g., 520, 522) are the same as incoming packets (e.g., 506, 512).

Figure 7:
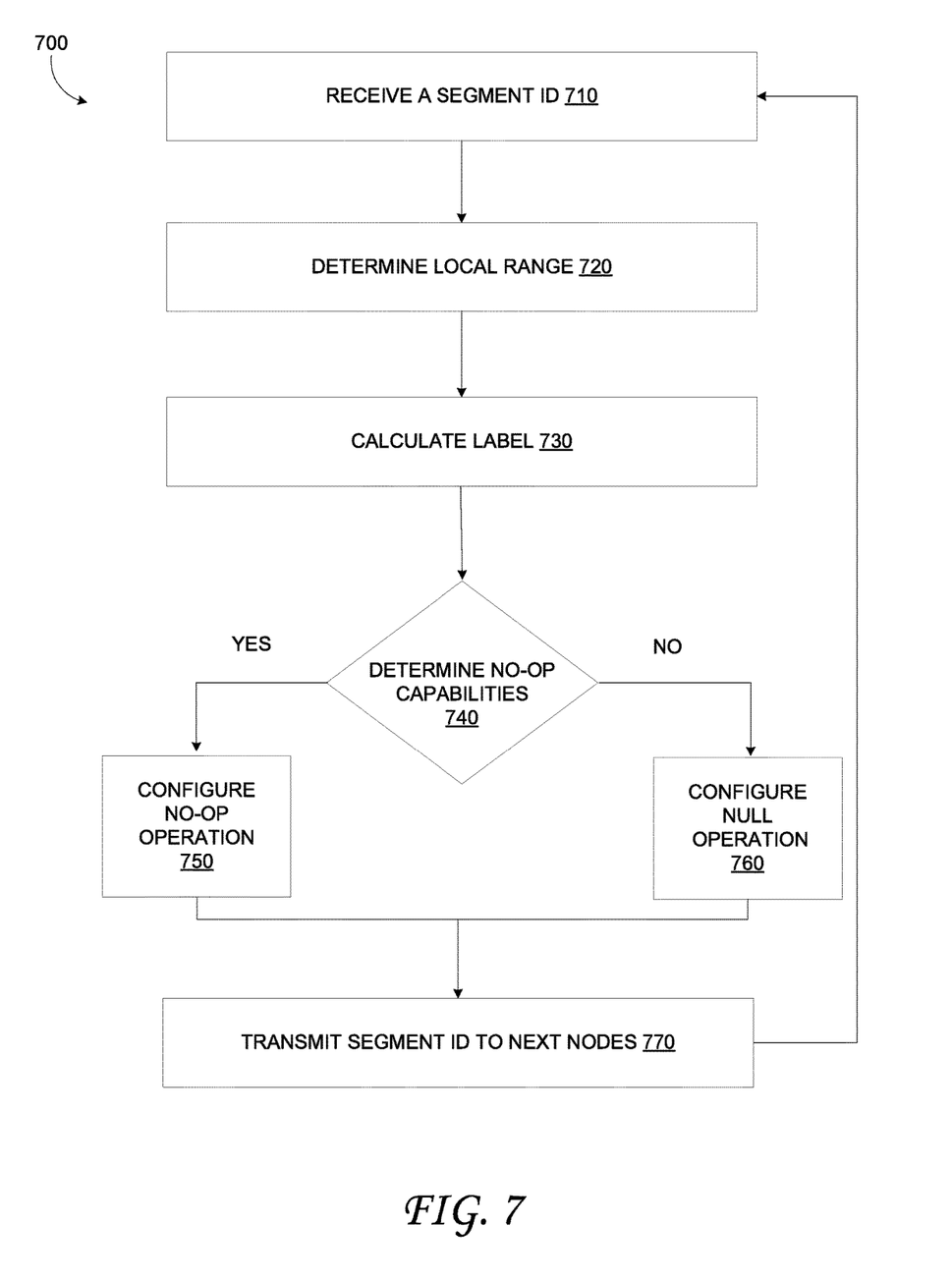
FIG. 7 illustrates an example method of negotiating a no-op segment routing tunnel.

Next the disclosure turns to, negotiating the segmented routing tunnels of an end-point with no-op operations which is described in example method 700 of FIG. 7. The method shown in FIG. 7 is provided by way of example, as there are a variety of ways to carry out the method. Additionally, while the example method is illustrated with a particular order of sequences, those of ordinary skill in the art will appreciate that FIG. 7 and the sequences shown therein can be executed in any order that accomplishes the technical advantages of the present disclosure and can include fewer or more sequences than illustrated.

Each sequence shown in FIG. 7 represents one or more processes, methods or subroutines, carried out in the example method. The sequences shown in FIG. 7 can be implemented in a systems such as networks 300, 500 shown in FIGS. 3, 5. The flow chart illustrated in FIG. 7 will be described in relation to and make reference to at least the elements of forwarding engine 202 shown in FIGS. 3, 5.

Method 700 can begin at step 710. At step 710 the control plane of a forwarding engine can receive a segment ID from an end-point. For example, forwarding engine (e.g., 202) can receive from an end-point a segment IS. A segment ID is a unique identifier for an end-point. For example, as shown in FIGS. 3,5 the segment IDs are 101 and 102. During the negotiation of segment routing tunnel for an end-point, the end-point transmits to the hops, it can contact directly, its unique segment ID. Those hops receive the segment ID and then transmit the segment ID to all of their next hops, and so on until all nodes within the local network have received the segment ID.

At step 720, the control plane of the forwarding engine determines a local range. For example, as shown in FIGS. 3, 5 the local range is 10,000. The local range will be unique to the local network. That is, all hops in the segment routing tunnel will have the same local range (e.g., 10,000).

At step 730, the control plane of the forwarding engine determines a label. The label will be unique for packets traversing the specific segment routing tunnel of the specific end-point. The label can be calculated by adding together the segment ID and local range. For example, as shown in FIGS. 3, 5 the labels are 10101 (10,000 added to 101) and 10102 (10,000 added to 102).

At step 740, the control plane can determine whether or not the forwarding engine can be configured to support a "NO-OP" label operation. The "NO-OP" label operation, when configured, informs the data plane that it should ignore performing label operations and proceed to forward the packet to the next hop according the label and ECMP principals. The "NO-OP" can be configured uniformly across a network topology or can be distributed using a control plane protocol. By default, the "NO-OP" can be set to "explicit null label."

At step 750, the control plane of the forwarding engine can configured "NO-OP" operation. For example, when an incoming packet is received at the forwarding engine, label operations (e.g., swap, pop, push, etc.) are ignored and the packet is transmitted to a next hop according to the label and ECMP principals.

At step 760, when "NO-OP" cannot be configured, the control plane of the forwarding engine can push a "NULL" to the label. For example, when an incoming packet is received at the forwarding engine, a "NULL" is pushed to the top of the label stack. When the packet is received at the next hop, the forwarding engine first reads the "NULL" entry at the top of the stack and ignores any label operations and forwards the packet to the next hop according to the label and ECMP principals.

At step 770, the control plane of the forwarding engine can transmit the segment ID to the next hops. The method 700 can then be performed on the next hops until all hops on the local network have been configured to perform a "NO-OP" operation or "NULL" operation for incoming packets with the corresponding label.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method for end-point scaling on a segment routing network, the method comprising:
   receiving, at a node of a segment routing tunnel, a packet and a label;
   pushing, to the label, a no-op label;
   determining a best next node of a plurality of nodes along a path of the segment routing tunnel corresponding to the label;
   transmitting the packet with the no-op label to the best next node;
   receiving, at the best next node, the packet;
   ignoring label operations for the packet if the best next node is not configured as a no-op node; and
   ignoring label operations for altering the label if the best next node is configured as a no-op node.

2. The method of claim 1, further comprising:
   determining another best next node of the plurality of nodes along the path of the segment routing tunnel corresponding to the label if the best next node is not configured as the no-op node; and
   forwarding, without altering the label, the packet to the another best next node.

3. The method of claim 1, further comprising:
   transmitting the packet to another best next node along the path of the segment routing tunnel based on the label and an equal cost multipath routing object if the best next node is configured as the no-op node.

4. The method of claim 1, wherein the node utilizes equal cost multipath routing.

5. The method of claim 2, wherein each of the node and best next nodes utilize equal cost multipath routing.

6. The method of claim 1, wherein a no-op label operation is configured over an entire massively scalable data center network.

7. The method of claim 1, wherein a no-op label operation is distributed by a control plane protocol for each segmented routed tunnel.

8. The method of claim 1, wherein the node maintains a single equal cost multipath routing object configured to switch a set of segment routing tunnels that share equal cost multipath routing links in a massively scalable data center network.

9. The method of claim 1, wherein the label is unique for the segment routing tunnel.

10. A method for end point scaling on a segment routing network, the method comprising:
    receiving, at a node of a segment routing tunnel, a packet and a label;
    ignoring label operations for altering the label at the node;
    determining a best next node of a plurality of nodes along a path of the segment routing tunnel corresponding to the label and an equal cost multipath routing object;
    transmitting, the packet and the label to the best next node along the path of the segment routing tunnel;
    receiving, at the best next node, the packet;
    ignoring label operations for the packet at the best node if the best next node is not configured as a no-op node; and
    ignoring label operations for altering the label if the best next node is configured as a no-op node.

11. The method of claim 10, further comprising:
    transmitting the packet to another best next node along the path of the segment routing tunnel based on the label and the equal cost multipath routing object if the best next node is configured as the no-op node.

12. The method of claim 10, further comprising:
    determining another best next node of the plurality of nodes along the path of the segment routing tunnel corresponding to the label if the best next node is not configured as the no-on node; and
    forwarding the packet to the another best next node.

13. The method of claim 10, wherein each of the node and best next nodes utilize equal cost multipath routing.

14. The method of claim 11, wherein the node utilizes equal cost multipath routing.

15. The method of claim 10, wherein a no-op label operation is configured over an entire massively scalable data center network.

16. The method of claim 10, wherein a no-op label operation is distributed by a control plane protocol for each segment of a routing tunnel of the segment routing tunnel.

17. The method of claim 10, wherein the node maintains the equal cost multipath routing object is configured to switch a set of segment routing tunnels that share equal cost multipath routing links in a massively scalable data center network.

18. The method of claim 10, wherein the label is unique for the segment routing tunnel.

* * * * *